US012777558B2

(12) United States Patent
Hong

(10) Patent No.: US 12,777,558 B2
(45) Date of Patent: Oct. 27, 2026

(54) MBS DATA CONTROL METHOD AND DEVICE

(71) Applicant: KT CORPORATION, Gyeonggi-do (KR)

(72) Inventor: Sung-pyo Hong, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 409 days.

(21) Appl. No.: 18/281,444

(22) PCT Filed: Mar. 16, 2022

(86) PCT No.: PCT/KR2022/003640
§ 371 (c)(1),
(2) Date: Sep. 11, 2023

(87) PCT Pub. No.: WO2022/197080
PCT Pub. Date: Sep. 22, 2022

(65) Prior Publication Data

US 2024/0172329 A1 May 23, 2024

(30) Foreign Application Priority Data

Mar. 16, 2021 (KR) ........................ 10-2021-0033994
Mar. 15, 2022 (KR) ........................ 10-2022-0031952

(51) Int. Cl.
*H04W 76/40* (2018.01)
*H04W 76/20* (2018.01)
(Continued)

(52) U.S. Cl.
CPC ........... *H04W 76/40* (2018.02); *H04W 76/20* (2018.02); *H04W 76/30* (2018.02); *H04W 80/02* (2013.01)

(58) Field of Classification Search
CPC ..... H04W 76/40; H04W 76/20; H04W 76/30; H04W 80/02; H04W 76/38; H04W 76/27; H04W 4/06
See application file for complete search history.

(56) References Cited

U.S. PATENT DOCUMENTS

2020/0059991 A1 2/2020 Wu
2020/0205220 A1 6/2020 Lee et al.
(Continued)

FOREIGN PATENT DOCUMENTS

CN 101444012 A 5/2009
CN 111771422 A 10/2020

OTHER PUBLICATIONS

3GPP, "3rd Generation Partnership Project; Technical Specification Group Services and System Aspects; Study on architectural enhancements for 5G multicast-broadcast services (Release 17)", 3GPP TR 23.757 V1.0.0 (Sep. 2020), pp. 1-231.
(Continued)

*Primary Examiner* — Will W Lin
(74) *Attorney, Agent, or Firm* — IP Legal Services, LLC

(57) ABSTRACT

Provided are a method and a device for receiving multicast/broadcast service (MBS) data. The method may receiving an RRC message from a base station; configuring a data inactivity timer on the basis of the RRC message; and when an MAC entity receives an MBS Traffic channel (MTCH) MAC SDU for the MBS, starting or restarting the data inactivity timer.

11 Claims, 12 Drawing Sheets

(51) Int. Cl.
*H04W 76/30* (2018.01)
*H04W 80/02* (2009.01)

(56) References Cited

U.S. PATENT DOCUMENTS

| | | | | |
|---|---|---|---|---|
| 2020/0351980 | A1 | 11/2020 | Talebi Fard et al. | |
| 2021/0392467 | A1* | 12/2021 | Kim | H04W 76/40 |
| 2023/0068311 | A1* | 3/2023 | Kim | H04W 76/40 |
| 2023/0254933 | A1* | 8/2023 | Han | H04L 1/1812 370/312 |
| 2023/0396965 | A1* | 12/2023 | Shrivastava | H04W 80/02 |

OTHER PUBLICATIONS

Vivo, "Summary for MBS Group Scheduling under Agenda Item 8.1.2.4", R2-2102249, 3GPP TSG-RAN WG2 Meeting #113-electronic, Online, Jan. 25-Feb. 5, 2021.

LG Electronics Inc., "DataInactivityTimer for INACTIVE in eLTE", R2-1808425, 3GPP TSG-RAN WG2 Meeting #102, Busan, Korea, May 21-May 25, 2018.

Nokia et al., "KI#1: Conclusion update for MBS Session activation/deactivation and UE join/leave", S2-2101017, 3GPP TSG SA WG2 Meeting #143E, Electronic meeting, Feb. 24-Mar. 9, 2020, pp. 1-23.

Samsung, "MAC Running CR for NR IIOT", R2-1916352, 3GPP TSG-RAN2Meeting #108, Reno, USA, Nov. 18-22, 2019.

LG Electronics Inc., "Discussion on overall architecture of MBS traffic delivery", R2-2101860, 3GPP TSG-RAN2 #113e, Electronic meeting, Jan. 25-Feb. 5, 2021, pp. 1-7.

LG Electronics, "New MBS architecture and procedures", S2-2000350, SA WG2 Meeting #136AH, Jan. 13-17, 2020, Incheon, Korea, pp. 1-12.

3GPP, "3rd Generation Partnership Project; Technical Specification Group Services and System Aspects; Study on architectural enhancements for 5G multicast-broadcast services (Release 17)", 3GPP TR 23.757 V1.3.0 (Mar. 2021), pp. 1-291.

* cited by examiner

MBS DATA CONTROL METHOD AND DEVICE

CROSS REFERENCE TO RELATED APPLICATIONS

This application is a National Stage Patent Application of PCT International Patent Application No. PCT/KR2022/003640 (filed on Mar. 16, 2022) under 35 U.S.C. § 371, which claims priority to Korean Patent Application Nos. 10-2021-0033994 (filed on Mar. 16, 2021), and 10-2022-0031952 (filed on Mar. 15, 2022), the teachings of which are incorporated herein in their entireties by reference.

TECHNICAL FIELD

The disclosure relates to a method and apparatus for a user equipment (UE) to process multicast/broadcast service (MBS) data in an NR-based mobile communication network.

BACKGROUND ART

In a broadcast communication service, the identical service along with the same specific content data may be concurrently provided to all UEs within one geographic area, such as a broadcast coverage. All UEs within the broadcast coverage could potentially receive the broadcast communication service. The broadcast communication service may be delivered to the UE through a broadcast session. During the broadcast session, the UE may receive MBS data while in RRC idle, RRC inactive, and RRC connected states.

In a multicast communication service, the identical service along with the same specific content data may be concurrently provided to a designated set of UEs. The multicast communication service may be delivered to the UE through a multicast session. During the multicast session, the UE may receive MBS data in an RRC connected state.

As such, the multicast/broadcast service necessitates a technique for efficiently utilizing network resources while transmitting data to a plurality of UEs. In particular, there is a need for a technique for efficiently utilizing network resources by activating/deactivating a multicast session. Nevertheless, no specific procedures and techniques have been proposed.

DETAILED DESCRIPTION OF THE INVENTION

Technical Problem

The disclosure provides a method and apparatus for a UE to efficiently process MBS data.

Technical Solution

In an aspect, a method may be provided for receiving multicast/broadcast service (MBS) data by a UE. The method may include receiving an RRC message from a base station, configuring a data inactivity timer based on the RRC message, and if an MAC entity receives an MBS traffic channel (MTCH) MAC SDU for an MBS, starting or restarting the data inactivity timer.

In another aspect, a method may be provided for controlling multicast/broadcast service (MBS) data by a base station. The method may include receiving at least one of MBS session state information, a message for activating an MBS session, and a message for deactivating the MBS session from a core network entity and controlling a radio resource configuration associated with the MBS session based on at least one of the MBS session state information, the message for activating the MBS session, and the message for deactivating the MBS session.

In further another aspect, a UE may be provided for receiving multicast/broadcast service (MBS) data. The UE may include a receiver configured to receive an RRC message from a base station and a controller configured to set up a data inactivity timer based on the RRC message and, in an event that an MAC entity receives an MBS traffic channel (MTCH) MAC SDU for an MBS, start or restart the data inactivity timer.

In still another aspect, a base station may be provided for controlling multicast/broadcast service (MBS) data. The base station may include a receiver configured to receive at least one of MBS session state information, a message for activating an MBS session, and a message for deactivating the MBS session from a core network entity and a controller configured to control a radio resource configuration associated with the MBS session based on at least one of the MBS session state information, the message for activating the MBS session, and the message for deactivating the MBS session.

Advantageous Effects

According to embodiments in the disclosure, a UE can efficiently process MBS data.

MODE FOR CARRYING OUT THE INVENTION

Figure 1:
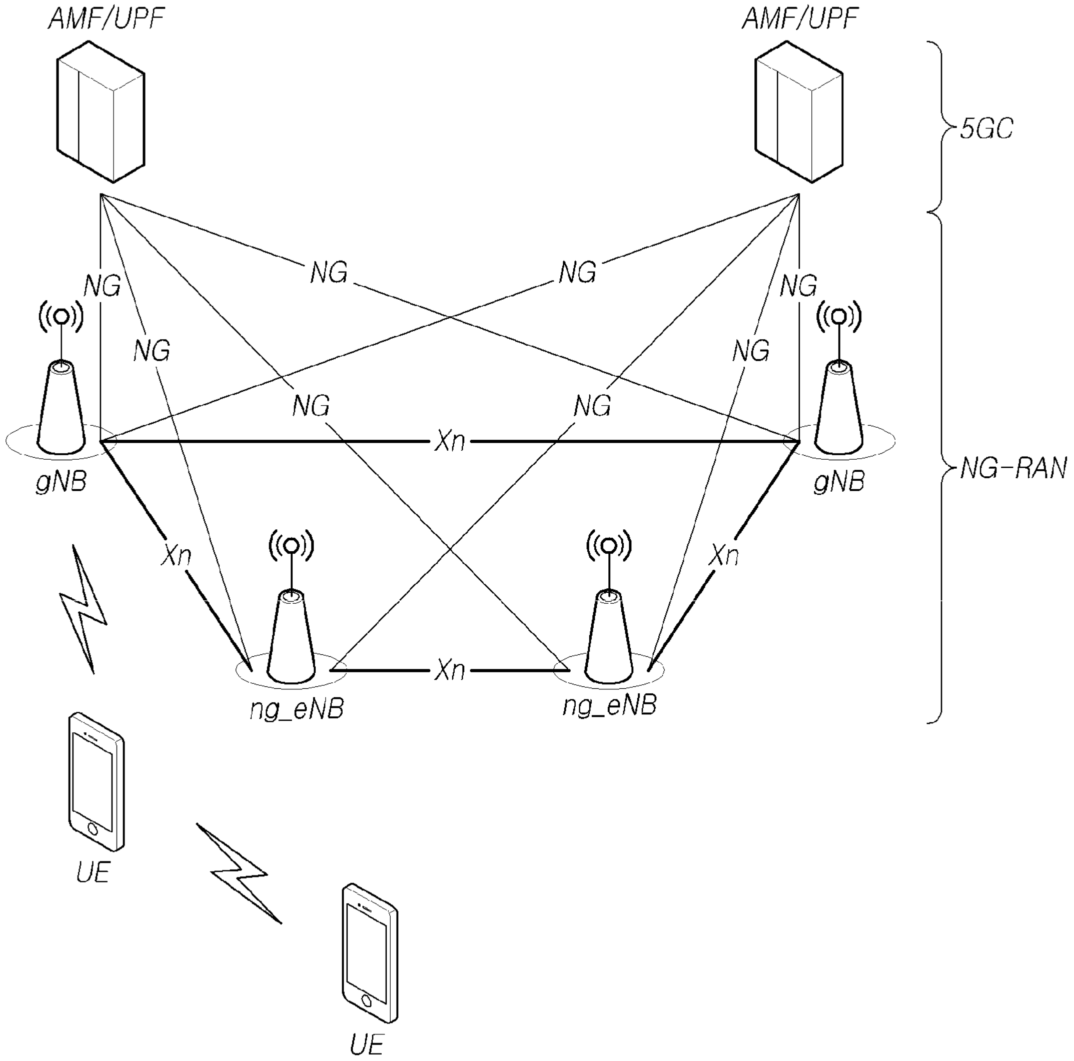
FIG. 1 is a view schematically illustrating an NR wireless communication system.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, Wi-Fi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE.

The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information through a control channel, such as a physical downlink control channel (PDCCH) and a physical uplink control channel (PUCCH). The uplink and downlink transmit and receive data through a data channel such as a physical downlink shared channel (PDSCH) and a physical uplink shared channel (PUSCH). Hereinafter, the transmission and reception of a signal through a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR discloses a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1: FR1) and frequency bands equal to or greater than 6 GHz (frequency range 2: FR2).

The gNB denotes a base station that provides a UE with an NR user plane and control plane protocol end, and the ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix (CP) for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario through frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP), and, as shown in Table 1 below, "μ" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | normal | Yes | Yes |
| 1 | 30 | normal | Yes | Yes |
| 2 | 60 | Normal, Extended | Yes | No |
| 3 | 120 | normal | Yes | Yes |
| 4 | 240 | normal | No | Yes |

Figure 2:
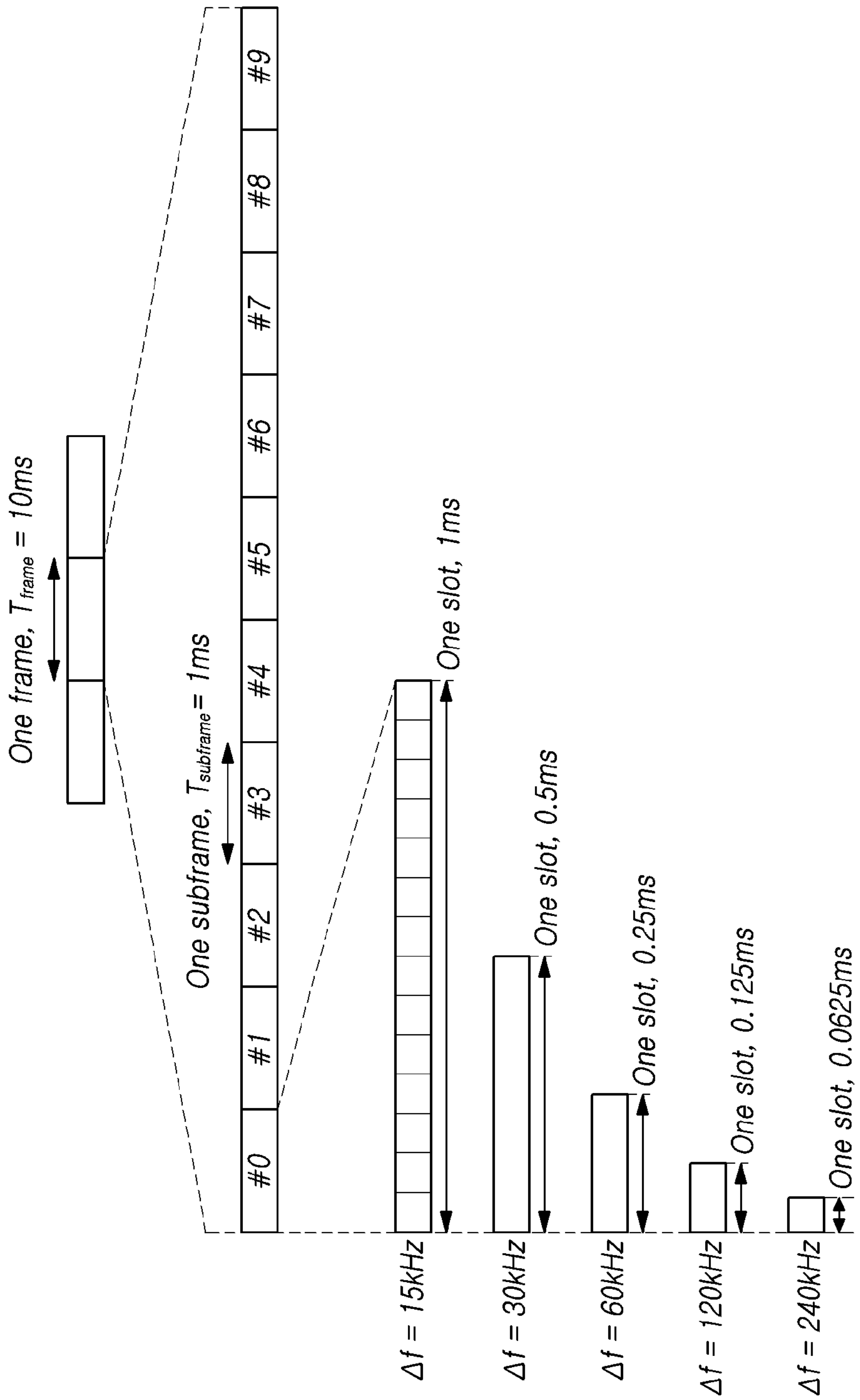
FIG. 2 is a view for explaining a frame structure in an NR system.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 12, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system.

Referring to FIG. 2, in the case of a typical CP, a slot includes 14 OFDM symbols fixedly. However, the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
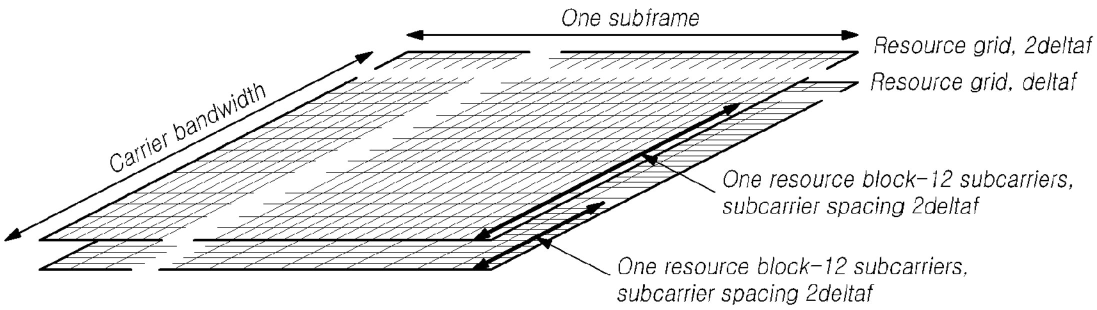
FIG. 3 is a view for explaining resource grids supported by a radio access technology.

FIG. 3 is a view for explaining resource grids supported by a radio access technology.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
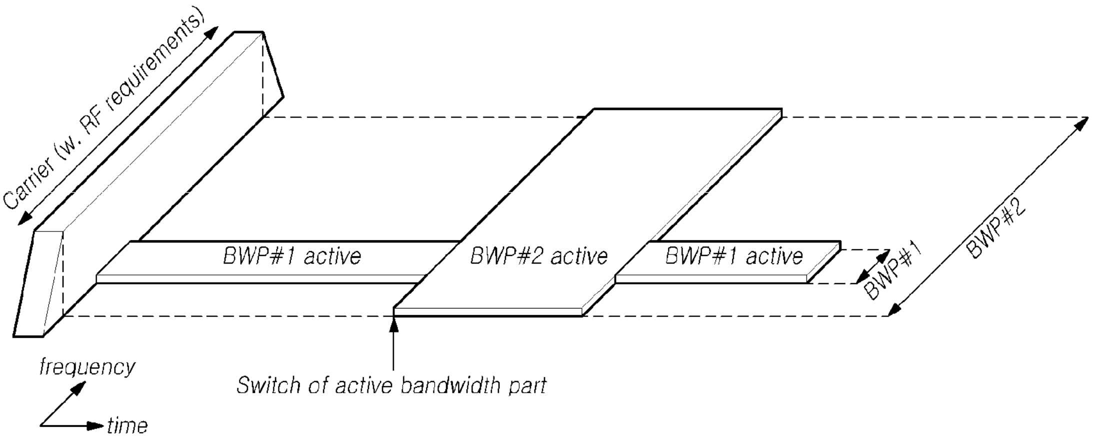
FIG. 4 is a view for explaining bandwidth parts supported by a radio access technology.

FIG. 4 is a view for explaining bandwidth parts supported by a radio access technology.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink, and the UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs so as to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
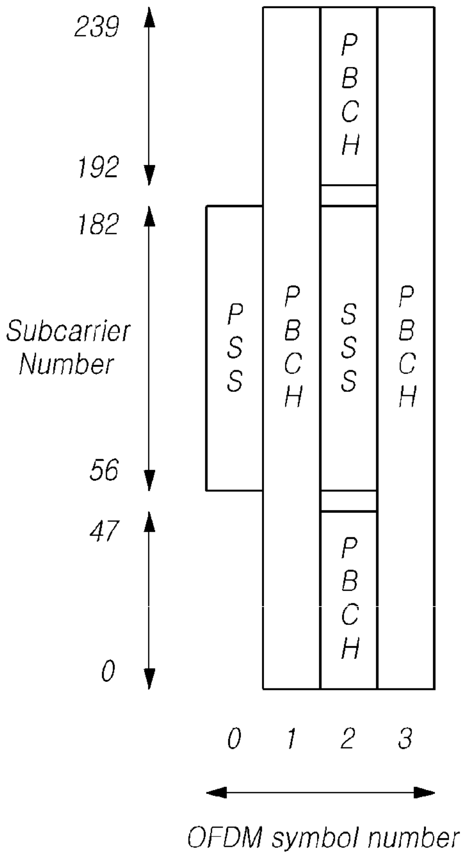
FIG. 5 is a view illustrating an example of a synchronization signal block in a radio access technology.

FIG. 5 is a view illustrating an example of a synchronization signal block in a radio access technology.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that can be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB through the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure. The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted through a PDSCH. In order to receive SIB1, the UE must receive numerology information used for the SIB1 transmission and the CORESET (control resource set) information used for scheduling of SIB1 through a PBCH. The UE identifies scheduling information for SIB1 using SI-RNTI in the CORESET, and acquires SIB1 on the PDSCH according to scheduling information. The remaining SIBs other than SIB1 may be periodically transmitted, or the remaining SIBs may be transmitted according to the request of the UE.

Figure 6:
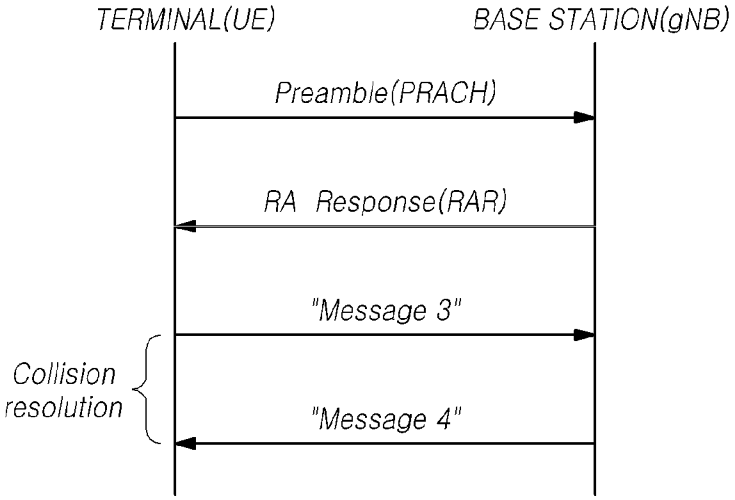
FIG. 6 is a view for explaining a random access procedure in a radio access technology.

FIG. 6 is a view for explaining a random access procedure in a radio access technology.

Referring to FIG. 6, if a cell search is completed, the UE transmits a random access preamble for random access to the base station. The random access preamble is transmitted through a PRACH. Specifically, the random access preamble is periodically transmitted to the base station through the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
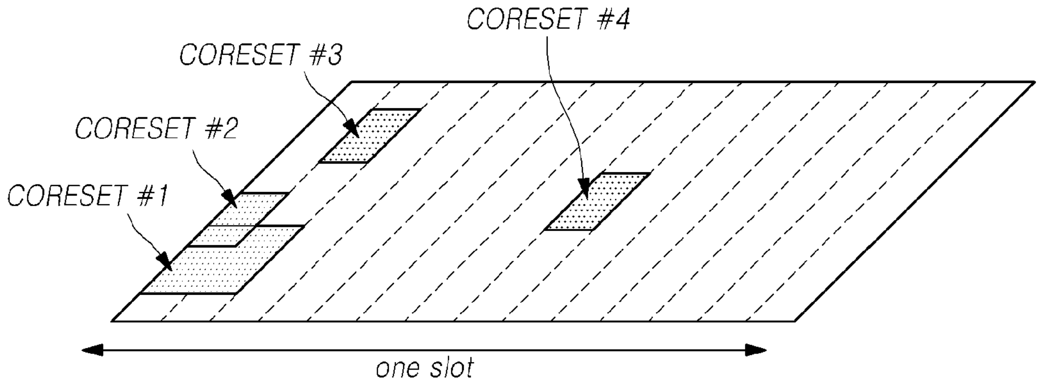
FIG. 7 is a view for explaining CORESET.

FIG. 7 is a view for explaining CORESETs.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In the disclosure, the frequency, frame, subframe, resource, resource block, region, band, subband, control channel, data channel, synchronization signal, various reference signals, various signals, or various messages related to new radio (NR) may be interpreted in various meanings used in the past, present, or future.

NR (New Radio)

NR is designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra-reliable and low latency communication (URLLC) are defined as representative usage scenarios of the NR. To meet requirements for each usage scenario, NR is designed to have more flexible frame structure as compared to the LTE/LTE-Advanced. Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on time division multiplexing (TDM), frequency division multiplexing (FDM), or TDM/FDM over one NR carrier, and ii) methods of supporting one or more time units in configuring a scheduling unit in the time domain. In this regard, in NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of NR has the time duration of 1 ms. Unlike LTE, since the subframe of NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS). As a result, a short time domain scheduling interval may be configured for UL/DL data transmission or reception based on the mini-slot. Also, a long time domain scheduling interval may be configured for the UL/DL data transmission or reception by slot aggregation. Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot may be defined to be made up of fewer OFDM symbols than the slot. Thus the scheduling for the latency critical data, such as the URLLC, may be performed based on the mini-slot.

Meanwhile, in NR, the default scheduling unit has been changed to a slot. Further, regardless of subcarrier-spacing, the slot consists of 14 OFDM symbols. In contrast, NR supports a non-slot structure configured of 2, 4, or 7 OFDM symbols, which is a smaller scheduling unit. The non-slot structure may be utilized as a scheduling unit for URLLC service.

NR MBS (Multicast and Broadcast Services)

3GPP approved a task item for MBS based on 5G/NR in Rel-17. MBS denotes a multicast communication service and a broadcast communication service.

In a broadcast communication service, the identical service along with the same specific content data may be concurrently provided to all UEs within one geographic area, such as a broadcast coverage. In the broadcast communication service, all UEs in the broadcast coverage could potentially receive the broadcast communication service. The broadcast communication service may be delivered to the UE through a broadcast session. During the broadcast session, the UE may receive MBS data in RRC idle, RRC inactive, and RRC connected states.

In a multicast communication service, the identical service along with the same specific content data may be concurrently provided to a designated set of UEs. Not all UEs within multicast coverage are authorized for receiving the multicast communication service. The multicast communication service may be delivered to the UE through a multicast session. During the multicast session, the UE may receive MBS data in an RRC connected state.

For the multicast service, the base station may transfer the MBS data packet using the following method.

For the multicast service, the base station may transfer the MBS data packet using the following method.

PTP (Point To Point) transmission: a base station separately transfers separate copies of a MBS data packet. The base station may schedule a UE-specific PDSCH using a UE-specific PDCCH that is CRC-scrambled by a UE-specific RNTI (e.g., C-RNTI). The UE-specific PDSCH is scrambled with the same UE-specific RNTI (e.g., C-RNTI).

PTM (Point To Multipoint) transmission: a base station transfers a single copy of a MBS data packet to a set of UEs. The base station may schedule a group common PDSCH using a group common PDCCH that is CRC-scrambled by a group common RNTI (e.g., G-RNTI of LTE SC-PTM). The group common PDSCH is scrambled with the same group common RNTI.

The base station may dynamically determine whether to transmit multicast data to a UE by PTM or PTP. The base station may dynamically schedule multicast data to be transmitted and transmit the data to the UE. Meanwhile, it may be advisable to deactivate a specific multicast session while multicast data transmission to the UE for that particular session is not occurring. This approach enhances the efficient utilization of network resources. However, the current frame works lacks a designated control method for the activation or deactivation of a multicast session. Specifically, within a radio network, a UE may perform data inactivity monitoring through RRC procedure, possibly transitioning to an RRC idle state during this monitoring processes. In such instances, the UE may encounter difficulties in receiving MBS data. Despite this scenario, no specific operation method has been put forth to address this issue.

Therefore, it may be more advantageous to deactivate a specific multicast session in order to conserve radio resources when multicast data transmission is not intended for the respective UE within the specific multicast session. Nevertheless, there lacks a dedicated control method for managing UE operations based on the activation or deactivation of a multicast session within a radio network.

To address such issues, the disclosure introduces a method and apparatus for a UE to effectively receive MBS data during an activation/deactivation process during a multicast session.

Hereinafter, a method and apparatus for providing an NR radio access technology-based multicast/broadcast service (MBS) according to embodiments will be described. However, the embodiments are not limited to the NR radio access technology. For example, the embodiments of the disclosure may be applied to any radio access technology (e.g., LTE or 6G). The embodiments described in the disclosure may include the content of information elements and operations set forth in TS 38.321, the 3GPP NR MAC standard, and TS 38.331, the NR RRC standard. Although the disclosure does not contain the content of the UE operation related to the detailed definitions for the corresponding information elements, the content set forth in the standards may be incorporated in the disclosure.

For convenience of description, the following description focuses primarily on a method for receiving multicast communication service data by an RRC connected UE. However, this is for convenience of description. The embodiments may be applied to broadcast communication services as well. Further, the embodiments may also be applied to RRC idle or RRC inactive UEs.

The embodiments described below may be applied individually or in any combination thereof.

Figure 8:
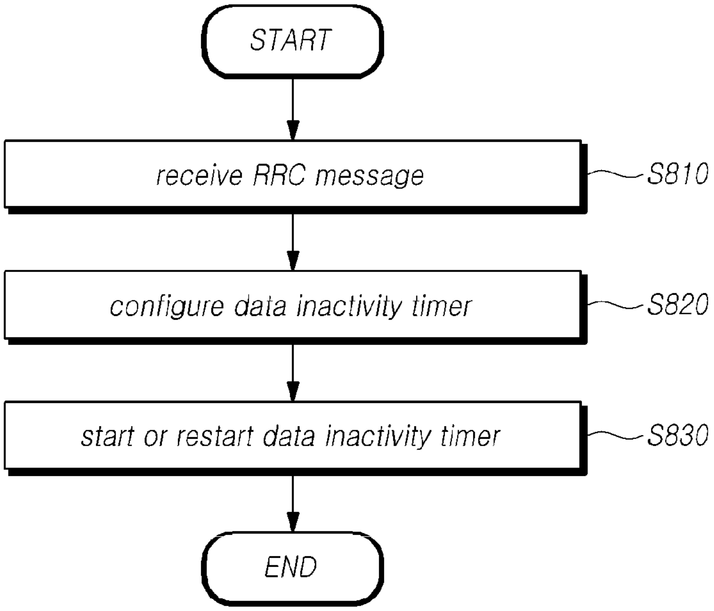
FIG. 8 is a flowchart for describing operations of a UE according to an embodiment.

FIG. 8 is a flowchart for describing operations of a UE according to an embodiment.

Referring to FIG. 8, the UE receiving multicast/broadcast service (MBS) data may perform the step of receiving an RRC message from the base station (S810).

In accordance with an embodiment, the UE may receive a higher layer message from the base station. For example, the higher layer message may be a a radio resource control (RRC) message. The RRC message may be an RRC connection reconfiguration message or an RRC connection configuration message.

The RRC message may include at least one of MBS radio bearer configuration information mapped to the MBS session and a data inactivity timer. For example, the MBS radio bearer configuration information may include information necessary to configure, in the UE, a radio bearer mapped to the MBS session to receive multicast data or broadcast data. The data inactivity timer may be included in the MBS radio bearer configuration information. Alternatively, the data inactivity timer may be included in a separate field distinguished from MBS radio bearer configuration information.

The UE may perform the step of configuring a data inactivity timer based on the RRC message (S820).

In accordance with an embodiment, the UE may configure a data inactivity timer in the UE based on data inactivity timer information included in the RRC message. Further, the UE may configure an MBS radio bearer mapped to the MBS session in the UE based on the RRC message. One or more MBS radio bearers may be configured. For example, the data inactivity timer is configured in the UE's MAC entity.

If the UE receives an MBS traffic channel (MTCH) MAC SDU for the MBS from the MAC entity, the UE may perform the step of starting or restarting the data inactivity timer (S830).

In accordance with an embodiment, the UE may control data reception in the MBS session based on the operation of the data inactivity timer. As an example, the data inactivity timer is configured to be started or restarted if the logical channel associated with the MBS session is received. In other words, when the MAC entity of the UE receives the MAC SDU of the MBCH, the UE may start or restart the data inactivity timer. As another example, the data inactivity timer for the UE in the RRC connected state may be configured to be started or restarted if multicast data is received during the active multicast session.

If the data inactivity timer expires, the MAC entity of the UE indicates (e.g., informs or notices) expiration of the data inactivity timer to the higher layer (RRC layer).

Meanwhile, the base station may configure radio resources associated with the MBS session based on at least one of MBS session state information received from the core network entity, a message for activating the MBS session, and a message for deactivating the MBS session. In accordance with an embodiment, the base station may receive the MBS session state information from the core network entity (e.g., AMF or SMF or MB-SMF). In accordance with another embodiment, the base station may receive the message for activating or deactivating the MBS session from the core network entity. Further, the base station may receive indication information for enabling MBS session state change (function), a timer (value) for checking MBS session state change, and the like from the core network entity. The above-described information may be received through an N2 message.

As described above, the UE may receive an RRC message from the base station. For example, when the MBS session state information received by the base station from the core network entity indicates that it is active, the RRC message may include the MBS radio bearer configuration information for the MBS session and be transmitted to the UE. In other words, if the base station receives MBS session state information from the core network entity and the MBS session state information includes a value indicating that it is active, the base station may transmit an RRC message including MBS radio bearer configuration information for the MBS session to the UE.

Alternatively, when receiving a message for activating the MBS session from the core network entity or receiving MBS data, the base station may transmit a paging message including an MBS session ID for an RRC idle UE or an RRC inactive UE. For example, the base station may receive a message for activating the MBS session from the core network entity. Alternatively, the base station may receive MBS data from the core network entity. In this case, the base station may transmit the paging message including the MBS session ID for RRC idle UE or RRC inactive UE. The UE may receive the paging message, change the RRC state, and proceed with MBS data reception.

Alternatively, when the MBS session state information indicates that it is inactive or when a message for deactivating the MBS session is received, the base station may release the radio resource configuration for the inactive MBS session not to allocate radio resources for the inactive MBS session. For example, when the MBS session state information indicates that it is inactive or the base station receives a message for deactivating the MBS session, the base station may release the radio resource configuration for the corresponding inactive MBS session. Thus, the base station may not allocate radio resources for the MBS session indicated as inactive or inactive.

According to the embodiments shown above, it is possible to prevent unnecessary waste of network resources for transmitting and receiving MBS data.

Figure 9:
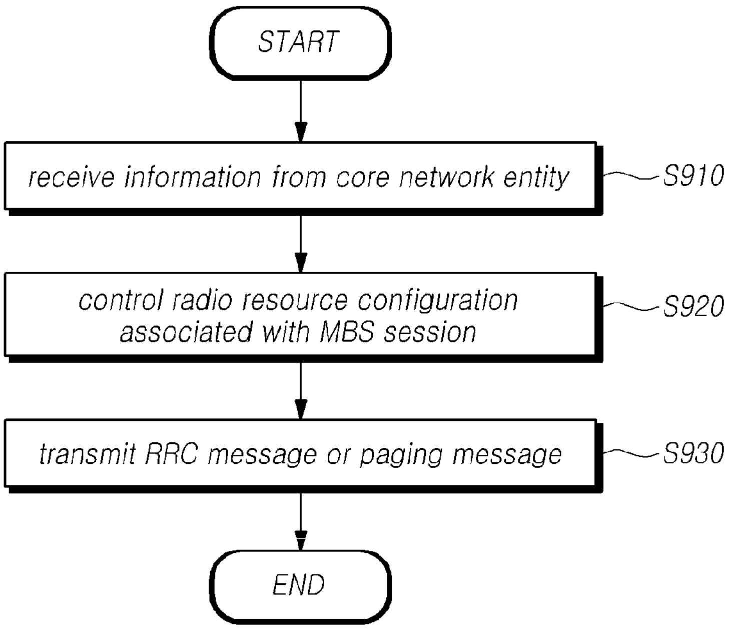
FIG. 9 is a flowchart for describing operations of a base station according to an embodiment.

FIG. 9 is a flowchart for describing operations of a base station according to an embodiment.

Referring to FIG. 9, the base station, controlling multicast/broadcast service (MBS) data, may perform receiving at least one of the MBS session state information, a message for activating the MBS session, and a message for deactivating the MBS session from a core network entity (S910).

According to an embodiment, the base station may receive the MBS session state information from the core network entity (e.g., AMF or SMF or MB-SMF). According to another embodiment, the base station may receive the message for activating or deactivating the MBS session from the core network entity. Further, the base station may receive indication information for enabling MBS session state change (function), a timer (value) for checking MBS session state change, and the like from the core network entity. The above-described information may be received through an N2 message.

The base station may perform controlling the radio resource configuration associated with the MBS session based on at least one of the MBS session state information, the message for activating the MBS session, and the message for deactivating the MBS session (S920).

According to an embodiment, the base station controls the radio resource configuration associated with the MBS session based on messages and information received from the core network entity. Further, the base station may transmit an RRC message or a paging message to the UE based on the message and information received from the core network entity. To that end, the base station may perform operations, such as configuring an MBS radio bearer and configuring radio resources.

For example, when the MBS session state information received by the base station from the core network entity indicates that it is active, the base station may perform transmitting an RRC message including the MBS radio bearer configuration information for the MBS session to the UE (S930). The RRC message may be an RRC connection reconfiguration message or an RRC connection configuration message. Such operation S930 may be omitted and may be optionally performed as needed.

As another example, when the base station receives a message for activating the MBS session from the core network entity or receives MBS data, the base station may perform transmitting a paging message including an MBS session ID for an RRC idle UE or an RRC inactive UE (S930). For example, the base station may receive a message for activating the MBS session from the core network entity. Alternatively, the base station may receive MBS data from the core network entity. In this case, the base station may transmit the paging message including the MBS session ID for RRC idle UE or RRC inactive UE. The UE may receive the paging message, change the RRC state, and proceed with MBS data reception.

As another example, when the MBS session state information indicates inactive or when the base station receives a message for deactivating the MBS session, the base station may control to release the radio resource configuration for the inactive MBS session to prevent radio resources from being allocated for the inactive MBS session. For example, when the MBS session state information indicates inactive or the base station receives a message for deactivating the MBS session, the base station may release the radio resource configuration for the corresponding inactive MBS session. Thus, the base station may not allocate radio resources for the MBS session indicated as inactive or inactive.

As described above, the core network entity may be an AMF or an SMF or an MB-SMF.

The UE, receiving the RRC message or paging message from the base station, may perform the operations described with reference to FIG. 8 to control the MBS data reception operation.

According to the embodiments described above, it is possible to prevent unnecessary waste of network resources for transmitting and receiving MBS data.

Hereinafter, various embodiments that may be performed by the above-described UE and base station will be separately described. The embodiments described below may be performed independently or in any combination with the above-described UE and base station operations. In the disclosure, the MBS data transmission is used in the same meaning as PTM transmission or group common PDSCH transmission, if necessary. Accordingly, the terms may be interchanged.

A Method for Controlling not to Transit a Receiving UE to a RC Idle State Before Triggering MBS Session Deactivation The UE may be configured with a data inactivity monitoring function by the RRC layer in the RRC connected state. If the data inactivity timer is configured, the UE should operate as follows.

If any MAC entity receives a MAC SDU for dedicated traffic channel (DTCH) logical channel, dedicated control channel (DCCH) logical channel, MBS traffic channel (MTCH), or common control channel (CCCH) logical channel, or If any MAC entity transmits a MAC SDU for DTCH logical channel or DCCH logical channel, The UE (MAC entity of the UE) starts or restarts the data inactivity timer.

If the data inactivity timer expires,

The UE (MAC entity of the UE) indicates expiration of the data inactivity timer to the higher layer (RRC layer).

If the higher layer (RRC layer) receives expiration of the data inactivity timer from the lower layer (MAC layer), the UE performs an action to enter the RRC IDLE. The UE resets the MAC layer and releases all the radio resources and indicates the release of the RRC connection to the NAS/application layer.

If the UE receives data associated with the active multicast session through an MBS session activation procedure, it is needed to maintain the RRC connected state of the UE in the active multicast session state. Or, it is required to control the receiving UE not to switch to the RRC idle state before MBS session deactivation is triggered. Or, when an MBS radio bearer associated with the active MBS session is configured and the UE is receiving data, the receiving UE needs to be controlled not to switch to the RRC idle state.

Otherwise, the UE may switch to the RRC idle state and have difficulties in receiving MBS session data. For example, even in the RRC idle state, the MBS radio bearer configuration may be maintained to receive data. However, in this case, the base station does not maintain the UE's context, so that it may be hard to continuously provide service as the UE moves.

A Method for not Configuring a Data Inactivity Function/Timer when Configuring an MBS Radio Bearer associated with an Active MBS Session (or Indicating Activation for an MBS Session) (Method for Disabling a Corresponding Function by Releasing the Corresponding Function or Indicating a Specific Value if there is a Configured UE)

The base station may configure the MBS radio bearer mapped to the active MBS session to the UE through a multicast session configuration procedure. Or, the base station may set the MBS session to the active state through the multicast session configuration procedure and configure the MBS radio bearer mapped to the MBS session to the UE. Or, the base station may set/activate the MBS session to the active state through the multicast session activation procedure, configure/modify/change the MBS radio bearer mapped to the MBS session to the UE and transmit MBS data.

The base station may receive an N2 message (or message from 5GC through the AMF) from the AMF (or any 5GC node/entity, e.g., SMF/MB-SMF) through a multicast session configuration procedure or multicast session activation procedure. The message may include information for indicating the multicast session as the active state or information for indicating activation of the multicast session. The message may include a paging message for paging the CM IDLE UE joining the multicast session. The information for indicating the multicast session as active state or information for indicating activation of the multicast session may be included in the paging message for paging the CM IDLE UE joining the multicast session. The message may include MBS session context information. The MBS session context information may include one or more of MBS session ID, source specific multicast address, TMGI, multicast QoS flow information, MBS session AMBR, associated PDU session context, PDU session ID, S-NSSAI, PDU session AMBR, associated unicast QoS flow-multicast QoS flow information mapping/association, and multicast session state (active/ inactive), and information as to whether to support the multicast session state (active/inactive).

Upon receiving the above-described information, the base station may indicate (e.g., instruct, provide, transmit) a paging message to page the CM IDLE UE joining the multicast session through the radio interface (Uu). Alternatively, upon receiving the above-described information, the base station may indicate (e.g., instruct, provide, transmit) a paging message to page the RRC INACTIVE UE joining the multicast session through the radio interface (Uu). Alternatively, upon receiving the above-described information, the base station may set/activate the MBS session to the active state and indicate, to the UE, the RRC reconfiguration message for configuring/modifying/changing the MBS radio bearer mapped to the MBS session to the UE. In this case, the base station may allow the data inactivity function/timer not to be configured in the UE. Alternatively, upon receiving the above-described information, the base station may set/activate the MBS session to the active state and indicate, to the UE, the RRC reconfiguration message for configuring/modifying/changing the MBS radio bearer mapped to the MBS session to the UE. In this case, if the data inactivity function/timer is configured/applied to the UE, the base station may instruct to release the configuration. For example, if the operation has been configured/reconfigured/applied to the UE as the MAC-cell group configuration includes the data inactivity timer in the previous configuration, the base station includes and transmits information for releasing the data inactivity timer in the MAC-cell group configuration on the RRC reconfiguration message. Or, the base station may include information for instructing to release the data inactivity timer in the MAC-cell group configuration on the RRC reconfiguration message, instructing the UE to reconfigure/modify/release the function/timer. Or, the base station may instruct the UE to reconfigure/modify/release the function/timer by not including the data inactivity timer in the MAC-cell group configuration on the RRC reconfiguration message. Or, the base station may indicate a specific value (e.g., infinity) as the data inactivity timer value in the MAC-cell group configuration on the RRC reconfiguration message, instructing the UE to reconfigure/modify/release the function/timer so that the function is not operated. For example, the base station may indicate the timer value as the infinite value, disabling the timer/function. The data inactivity timer value may be one of {s1, s2, s3, s5, s7, s10, s15, s20, s40, s50, s60, s80, s100, s120, s150, and s180, where s1 means 1 second}. The base station may designate one value for disabling the function and apply it to the UE or may add a new value to disable the function.

A Method for Associating (Controlling) Data Reception Associated with an MBS Session Based on Data Inactivity Timer Operations The MAC entity may additionally perform data reception through the MBS radio bearer mapped to the MBS session to the data inactivity timer operation, thereby preventing the UE from switching (e.g., transiting) to the RRC idle state while receiving MBS session data.

As an example, if the UE receives the logical channel associated with the MBS session when the data inactivity timer is configured in the UE, the UE may start or restart the data inactivity timer. The logical channel associated with the MBS session may indicate the MBS traffic logical channel and/or MBS control logical channel.

As another example, if the UE receives multicast data for the active multicast session when the data inactivity timer is configured for the UE in the RRC connected state, the UE may start or restart the data inactivity timer. The multicast data may indicate the multicast traffic channel and/or multicast control channel logical channel.

If any MAC entity receives a MAC SDU for dedicated traffic channel (DTCH) logical channel, dedicated control channel (DCCH) logical channel, common control channel (CCCH) logical channel, or MB traffic channel (MTCH) logical channel, or MB control channel logical channel, If any MAC entity transmits a MAC SDU for DTCH logical channel or DCCH logical channel, The UE (MAC entity of the UE) starts or restarts the data inactivity timer.

If the data inactivity timer expires,

The UE (MAC entity of the UE) indicates expiration of the data inactivity timer to the higher layer (RRC).

A Method for Stopping/Pausing/Suspending the Data Inactivity Timer if Receiving an MBS Session Activation Indication The base station may receive, from the core network entity, information for indicating the multicast session as the active state or information for indicating activation of the multicast session. Upon receiving the information (or including any information included in the above-described embodiments, such as MBS context information), the base station may set/activate the MBS session as active state and indicate an RRC reconfiguration message for configuring/modifying/changing the MBS radio bearer mapped to the MBS session to the UE. Upon receiving the message (or upon receiving any related indication information, such as MBS session activation state indication, data inactivity timer pause/stop/suspend indication), the UE may stop/pause/suspend the MBS data inactivity timer. Thus, the UE may be prevented from switching to the RRC idle state due to the function.

A Method for Disregarding Expiration of Data Inactivity Timer if Receiving MBS Session being Active The base station may receive, from the core network entity, information for indicating the multicast session as the active state or information for indicating activation of the multicast session. Upon receiving the information (or including any information included in the above-described embodiments, such as MBS context information), the base station may set/activate the MBS session as active state and indicate an RRC reconfiguration message for configuring/modifying/changing the MBS radio bearer mapped to the MBS session to the UE. Upon receiving the message (or upon receiving any related indication information, such as MBS session activation state indication, data inactivity timer pause/stop/suspend indication), the UE may stop/pause/suspend the MBS data inactivity timer. Thus, the UE may be prevented from switching to the RRC idle state due to the function.

Hereinafter, additional embodiments will be described. First, the following definitions are made regarding the MBS session state for resource-efficient multicast data transmission.

Configured multicast session (multicast session configuration state): multicast data is not transmitted. Some information regarding the multicast session is configured. However, no resource is reserved. For example, a TMGI is allocated, but complete session information is not provided to the UE. The UE may be allowed to join. However, a first accepted UE join request will trigger a multicast session establishment.

Active multicast session (multicast session active state): multicast data is transmitted to the UE that has joined the multicast session. A 5GC resource for the multicast session is reserved. A corresponding radio resource is reserved according to the position of the joining UE. The UE joining the multicast session is in the CM CONNECTED state. The UE is allowed to join the multicast session. It is a multicast session configured in the active state.

Inactive multicast session (multicast session inactive state): multicast data is not transmitted. The UE joining the multicast session is in the CM CONNECTED or CM IDLE state. The UE is allowed to join the multicast session. It is a multicast session configured in the inactive state.

A multicast session configuration procedure may be provided. There is included a network internal configuration for the multicast session, as, e.g., TMGI allocation request and/or providing information regarding the multicast session by the application function. No resource for the multicast session is reserved, or a resource may be reserved only in the MBS-related core network entity (e.g., MB-SMF, MB-UPF, or NEF). In contrast, in the inactive multicast session state, multicast data is not transmitted. The configuration may indicate whether or when a multicast session is created, and whether the multicast session is in an inactive state. The application function may provide a configuration in several steps. For example, it may be allowed to request a TMGI and then provide and configure the entire information regarding the multicast session.

Meanwhile, a multicast session setting procedure may be provided. When the join request of the first UE for the multicast session is accepted, the multicast session is set to the inactive or active state depending on the configuration. A 5G core (5GC) resource for the multicast session is being reserved.

Or, a multicast session activation procedure may be provided. The CM IDLE UE joining the multicast session is paged. Activation may be triggered by the application function request. Or, activation may be triggered by reception of multicast data.

Or, a multicast session deactivation procedure may be provided. Deactivation may be triggered by the application function request. Or, deactivation may be triggered by lack of reception of multicast data.

Or, a multicast session release procedure may be provided. All resources for the multicast session are released for all of the 5GC nodes and wireless network nodes. The UE joining the multicast session is notified of it. Release is possible for an active or inactive multicast session.

Or, a multicast session deconfiguration procedure may be provided. All information regarding the multicast session is removed from the 5GC. The TMGI is deallocated.

When a multicast session is configured, the multicast session may be set to the active state or inactive state. During the multicast session configuration procedure (for the active multicast session), the base station may set up/configure a data radio bearer mapped to the PDU session associated with the multicast session and/or the MBS radio bearer mapped to the multicast session and set the multicast session (to the active state). Or, during the multicast session configuration procedure (for the inactive multicast session), the base station may set up/configure a data radio bearer mapped to the PDU session associated with the multicast session and/or the MBS radio bearer mapped to the multicast session and set the multicast session (to the inactive state). The corresponding MBS radio bearer and/or data radio bearer may be configured to operate according to the MBS session inactive state. Or, during the multicast session configuration procedure (for the inactive multicast session), the base station may set up/configure only the data radio bearer mapped to the PDU session associated with the multicast session and set the multicast session (to the inactive state). Or, during the multicast session configuration procedure (for the inactive multicast session), the base station may set the multicast session (to the inactive state) without setting up/configuring a data radio bearer mapped to the PDU session associated with the multicast session or the MBS radio bearer mapped to the multicast session. Hereinafter, such an operation will be described in greater detail.

The UE may join the multicast session through a PDU session modification procedure in the RRC connected state. First, such a joining procedure will be described below.

To join a multicast group, the UE transmits a PDU session modify request message to the AMF. The message includes an MBS session ID for indicating the multicast group that the UE desires to join.

The AMF receives an MBS context for the multicast session from a relevant 5GC node/entity (SMF/MB-SMF) through signaling. For example, the SMF performs authorization on an MBS session join request and extracts multicast QoS flow information for the MBS session indicated through signaling with the MB-SMF. The SMF transmits the MBS session context to the AMF. The MBS session context may include one or more of MBS session ID, source specific multicast address, TMGI, multicast QoS flow information, MBS session AMBR, associated PDU session context, PDU session ID, S-NSSAI, PDU session AMBR, associated unicast QoS flow-multicast QoS flow information mapping/association, and multicast session state (active/inactive), and information as to whether to support the multicast session state (active/inactive).

The AMF transmits an N2 message including PDU session modify command information to the base station. The PDU session modify command information or N2 message may include MBS context information. The PDU session modify command information or N2 message may include the MBS session state (or multicast session state or information for indicating activation/deactivation of the MBS/multicast session). For example, the MBS session state (or multicast session state or information for indicating activation/deactivation of the MBS/multicast session) may be configured of one-bit information to distinguish active/inactive states (activation/deactivation indications).

If the base station supporting the MBS receives the MBS session ID, but no multicast session context is present for the MBS session ID, the base station uses the MBS session QoS information for allocating a resource for serving the MBS session. If the base station does not support the MBS, 5GC individual MBS traffic delivery may be performed. For example, the base station may transmit the MBS data received from the core network entity to the UE, in a PTP manner using a normal data radio bearer, through an individual tunnel between the base station and the UPF/MB-UPF using the PDU session context (unicast QoS flow information) associated with the MBS session. The base station may configure/reserve radio resources to the UE.

As an example, when the MBS session state is set to the active state and indicated (through the N2 message). The base station may indicate (e.g., provide, transmit) an RRC reconfiguration message including radio resource configuration information for receiving the MBS session data to the UE. The RRC reconfiguration message may include MBS radio bearer configuration information mapped to the MBS session and/or the data radio bearer information mapped to the PDU session associated with the MBS session. The data radio bearer may be configured based on the PDU session context (e.g., QoS flow information) mapped/associated to the MBS session. The data radio bearer may be used for transmission in the PTP scheme using the 5GC individual MBS traffic delivery.

The RRC reconfiguration message may include MBS session state information (active/inactive). The RRC reconfiguration message may include information configured in association with the multicast session state for the MBS radio bearer mapped to the multicast session. As an example, the RRC message may include information configured with the MBS radio bearer mapped to the multicast session (or data radio bearer mapped to the PDU session associated with the MBS session) distinguished for the active/inactive state. As another example, the RRC message may include information configured with the MBS radio bearer mapped to the multicast session (or data radio bearer mapped to the PDU session associated with the MBS session) distinguished for the active/inactive state.

(When the multicast session state is set to the active state and indicated), the UE may configure the MBS radio bearer and/or data radio bearer mapped to the PDU session associated with the MBS session. The UE may receive MBS session data through the configured MBS radio bearer and/or data radio bearer mapped to the PDU session associated with the MBS session.

Figure 10:
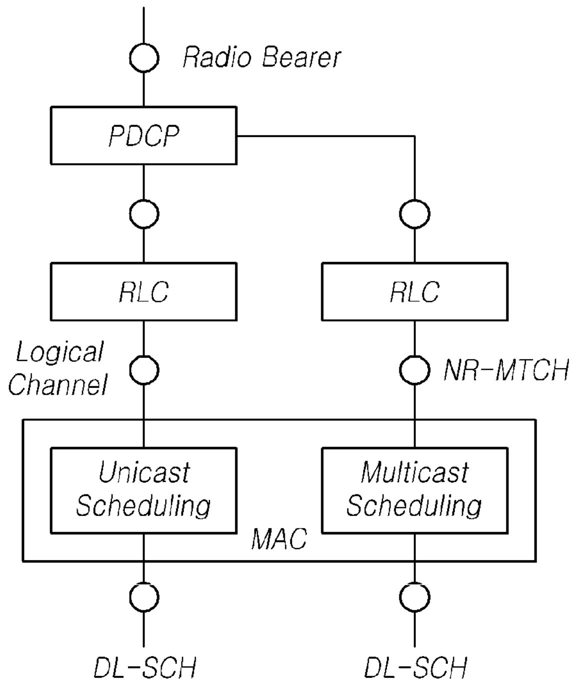
FIG. 10 is a view illustrating an example of a layer 2 structure for receiving MBS data according to an embodiment.

FIG. 10 is a view illustrating an example of a layer 2 structure for receiving MBS data.

Referring to FIG. 10, for an MBS service session belonging to one multicast group, the MBS radio bearer may be defined as a separate bearer structure having two legs/paths. One leg/path of the MBS radio bearer based on the separate bearer structure may include L2 entity(ies) configuration for (normal) unicast DRB for PTP transmission and perform PTP transmission. The other leg/path may include L2 entity (ies) configuration for PTM transmission and perform PTM transmission.

The RLC entity of unicast leg/path for PTP transmission may be configured in association with the logical channel identifier. Data may be received by scheduling indicated by the C-RNTI in the MAC. The RLC entity of the leg/path for PTM transmission may be distinguished per MBS session and be configured in association with the RNTI for identifying data reception or MBS session data transmission. Here, for convenience of description, MBS user data is referred to as NR-MTCH, but this is only for convenience of description and may be replaced with any other terms (e.g., MB Traffic Channel, Multicast Traffic Channel). Further, the RNTI for MBS data identification means a multicast session/multicast group specific RNTI or a group common RNTI for multicast traffic/data, similar to SC-RNTI and G-RNTI. Here, for convenience of description, it is referred to as MBS-G-RNTI. However, the embodiments are not limited thereto. It may be replaced with another term.

The RLC entity of the unicast leg/path for PTP transmission and the RLC entity of the leg/path for PTM transmission may be associated with one PDCP entity. The PDCP entity may be associated with an MBS service session (TMGI/MBS session ID/IP multicast address). The UE may receive MBS service data transmitted according to the transmission scheme selected by the base station. For example, the base station may transmit data through one path (or two paths) of the RLC entity of the unicast leg/path for PTP transmission and the RLC entity of the leg/path for PTM transmission in the PDCP entity and the UE may receive the data.

The base station is aware of one set of UEs having joined the corresponding multicast group. For example, in the structure as shown in FIG. 10, there may be as many RLC entities of the leg/path for PTM transmission as the number of RRC connected UEs having joined the corresponding multicast group.

Meanwhile, as another example, when the MBS session state is set to the inactive state and indicated (through the N2 message), the base station may indicate (e.g., instruct or inform) an RRC reconfiguration/release message including radio resource configuration information for receiving the MBS session data to the UE. The RRC reconfiguration/release message may include MBS radio bearer configuration information mapped to the MBS session. The RRC reconfiguration/release message may include multicast session state information (inactive). The RRC reconfiguration/release message may include inactive MBS radio bearer configuration information associated with the MBS session. The RRC reconfiguration/release message may include MBS radio bearer configuration information to be suspended, associated with the MBS session. The RRC reconfiguration/release message may include any configuration information for indicating that the MBS session is in the inactive state.

As another example, when the multicast session state is set to the inactive state and indicated (through the N2 message) (or when indicating the deactivation of the multicast session), the base station may indicate (e.g., provide, transmit) an RRC reconfiguration message including radio resource configuration information for the UE to receive the MBS session data to the UE. Or, the base station may indicate (e.g., provide, transmit) an RRC release message to release/suspend the radio resource configuration information for the UE to receive the MBS session data to the UE. The RRC reconfiguration/release message may include a PDU session modify command message. The PDU session modify command may be included and transmitted in the dedicated NAS-Message information element. The PDU session modify command message may include multicast session state information (inactive). The RRC reconfiguration/release message may include MBS radio bearer configuration information mapped to the MBS session. The NAS/higher layer of the UE receiving the PDU session modify command may indicate the state information (inactive) about the multicast session to the AS/RRC/lower layer. The RRC of the UE may suspend/release/switch to the inactive state the MBS radio bearer mapped to the multicast session.

As another example, when the multicast session state is set to the inactive state and indicated (through the N2 message) (or when indicating the deactivation of the multicast session), the base station may indicate an RRC reconfiguration/release message including radio resource configuration information for the UE to receive the MBS session data to the UE. The RRC reconfiguration/release message may include a PDU session modify command message. The PDU session modify command may be included and transmitted in the dedicated NAS-Message information element. The PDU session modify command message may include multicast session state information (inactive). (If the MBS radio bearer mapped to the MBS session is configured in the UE) the RRC reconfiguration/release message may include information for instructing to suspend the MBS radio bearer configuration information mapped to the MBS session. The RRC reconfiguration/release message may include data radio bearer configuration information mapped to the PDU session associated with the MBS session.

As another example, when the multicast session state is set to the inactive state and indicated (through the N2 message) (or when indicating the deactivation of the multicast session), the base station may indicate the MAC CE for indicating that the state of the multicast session is inactive to the UE. The MAC CE may include one or more of the MBS session ID information, TMGI, source specific IP multicast address, information for indicating the MBS session state, information for indicating MBS session activation/inactivation, MBS radio bearer identifier mapped to the MBS session, and data radio bearer identifier mapped to the PDU session associated with the MBS session. The MAC CE may be used to instruct a base station to perform UE operations related to the radio resource configuration associated with the MBS session, in association with a multicast session activation/deactivation procedure.

The above-described operations may be an example of reception of any information to indicate that the state of the multicast session is inactive.

Upon receiving any information to indicate that the state of the multicast session is inactive, the UE may perform one or more operations as follows.

The UE may configure the MBS radio bearer. The UE may store the MBS radio bearer. The UE may configure/store the MBS radio bearer in the inactive state. The UE may suspend the MBS radio bearer. The UE may suspend reception of data for the MBS session. The UE may consider that the MBS radio bearer is in the inactive multicast session state. The UE does not perform data reception through the MBS-G-RNTI. The UE stops/pauses/suspends data reception through the MBS-G-RNTI. The UE does not perform PDCCH monitoring through the MBS-G-RNTI. The UE does not perform group common PDCCH monitoring through the MBS-G-RNTI. The UE may release the MBS radio bearer. The UE may configure the data radio bearer mapped to the PDU session associated with the MBS session. The UE may suspend the data radio bearer mapped to the PDU session associated with the MBS session. Or, the UE may receive data through the data radio bearer mapped to the PDU session associated with the MBS session.

Meanwhile, when the MBS session supports the multicast session state (active/inactive change), the state change/switching (active/inactive) for the MBS session may be triggered by an application function request or by whether to receive multicast data. An activation/deactivation procedure may be initiated by the trigger.

As an example, when the MBS session supports the inactive state (or active-inactive state switch) during the MBS session configuration procedure, the AMF/SMF/MB-SMF may include and transmit one or more of the MBS session state (active/inactive), indication information for enabling MBS session state change (function), and timer (value) for checking the MBS session state change to the UPF/MB-UPF/base station. The UPF/MB-UPF/base station receiving the information may check the MBS session state change if the MBS session state is set to active. For example, if transmitting/receiving data/logical channel associated with the MBS session, the UPF/MB-UPF/base station starts or restarts the timer for checking the MBS session state change. If the timer for checking the MBS session state change expires, the UPF/MB-UPF/base station may transmit information for indicating MBS session deactivation to the AMF/SMF/MB-SMF. As another example, if the AMF/SMF/MB-SMF receives information for indicating MBS session deactivation, the AMF/SMF/MB-SMF may request the base station to deactivate the MBS session. As another example, if receiving data/logical channel associated with the MBS session from the UPF/MB-UPF, the base station starts or restarts the timer for checking the MBS session state change. If the timer for checking the MBS session state change expires, the base station may transmit information for indicating MBS session deactivation to the AMF.

As another example, upon receiving data for the multicast session in the inactive state, the MB-UPF/UPF/base station may notify the AMF/SMF/MB-SMF of it. The corresponding message may include MBS session identification information. The corresponding message may include indication information/message for notifying of downlink data for the MBS session (or for indicating that activation of the MBS session has been triggered). Upon receiving the message, the AMF may request/instruct the base station to activate the MBS session. The message for the AMF to request/instruct the base station to activate the MBS session may include one or more of paging message/related information, MBS session ID, information for indicating the MBS session state and information for indicating MBS session activation/deactivation. When a UE in the RRC idle state joins the multicast session, the AMF may page the UE through a CN-initiated paging procedure. The paging message transmitted from the AMF to the base station may include one or more of MBS session ID information, information for indicating the MBS session state, and information for indicating activation/deactivation of the MBS session. The paging message transmitted to the UE by the base station may include one or more of MBS session ID information, information for indicating the MBS session state, and information for indicating activation/deactivation of the MBS session. The paging message may be included in the paging record or UE identifier information element included in the paging record. As the UE identifier information element included in the current paging record, a 48-bit NG-5G-S-TMSI or a 40-bit full-RNTI may be selected. If the MBS session ID is a value smaller than 48 bits, it may be included and transmitted on the UE identifier information element. When the MBS session ID included in the paging message matches the MBS session ID of the inactive multicast session joined by the UE, the UE may initiate/perform any operation for receiving data through the MBS radio bearer or any procedure (RRC resume or RRC establishment) to resume the MBS radio bearer. As an example, the UE may instruct the base station to resume/activate data reception for the MBS session through the MAC CE and to resume/activate data reception through the MBS radio bearer. As another example, any operations included in the disclosure may be an example of any operation to receive data through the MBS radio bearer.

As another example, when there is a UE in the RRC inactive state, joining the inactive multicast session, the base station may page the UE through a RAN-initiated paging procedure. The paging message transmitted to the UE by the base station may include one or more of MBS session ID information, information for indicating the MBS session state, and information for indicating activation/deactivation of the MBS session. The paging message may be included in the paging record or UE identifier information element included in the paging record. Or, the paging message may be provided by the base station to the UE having switched to the RRC inactive state (RRC release with suspendconfig) among the UEs joining the multicast session. The paging message may be included in the paging record or UE identifier information element included in the paging record. As the UE identifier information element included in the current paging record, a 48-bit NG-5G-S-TMSI or a 40-bit full-RNTI may be selected. If the MBS session ID is a value smaller than 48 bits, it may be included and transmitted on the UE identifier information element. When the MBS session ID included in the paging message matches the MBS session ID of the inactive multicast session joined by the UE, the UE may initiate/perform any operation for receiving data through the MBS radio bearer or any procedure (RRC resume or RRC establishment) to resume the MBS radio bearer. As an example, the UE may instruct the base station to resume/activate data reception for the MBS session through the MAC CE or to resume/activate data reception through the MBS radio bearer. As another example, any operations included in the disclosure may be an example of any operation to receive data through the MBS radio bearer. The MAC CE may include one or more of MBS session ID information, TMGI, source specific IP multicast address, information for indicating the MBS session state, and information for indicating activation/deactivation of the MBS session.

If the base station receives information to instruct the deactivation of the multicast session from the AMF (or any 5GC node/entity), the base station may store the inactive state of the multicast session on the UE context of the UE. The base station may transmit an RRC release message (RRC release or RRC release with suspendconfig) according to the data inactivity timer of the UE, allowing the UE to enter the RRC idle or RRC inactive state. When the UE switches to the RRC inactive state, the AMF does not page the UE because it considers the UE as being in the CM CONNECTED state. Accordingly, if the multicast session state is triggered to change/switch from the inactive state to the active state, e.g., if the base station receives information for instructing to activate the multicast session from the AMF (or any 5GC node/entity), and/or if the base station receives data for the multicast session, the base station should perform RAN-initiated paging on the UE.

As another example, upon receiving the active multicast session state from the AMF or upon receiving information for instructing to activate the multicast session from the AMF, the base station may also receive assistance information to instruct the UE not to switch to the RRC inactive state. The corresponding information may include one or more of MBS session ID information, information for indicating the MBS session state, information for indicating activation/deactivation of the MBS session, and information as to whether to support the MBS session state. The corresponding information may be included in the core network assistance information for RRC inactive information element. The corresponding information may be provided in an information element distinguished from the core network assistance information for RRC inactive. If receiving the corresponding information, the base station may store the received corresponding information. The base station may use the stored corresponding information for determining the RRC inactive state or RAN paging. Or, the base station may release/remove/discard/update/disregard/override the stored core network assistance information for RRC inactive.

According to the described embodiments, the UE can effectively receive MBS service data. Hereinafter, hardware and software configurations of a UE and a base station for performing at least one of the operations of the above-described embodiments will be described. The UE and base station below are configured to be able to practice the above-described embodiments according to any combination.

Figure 11:
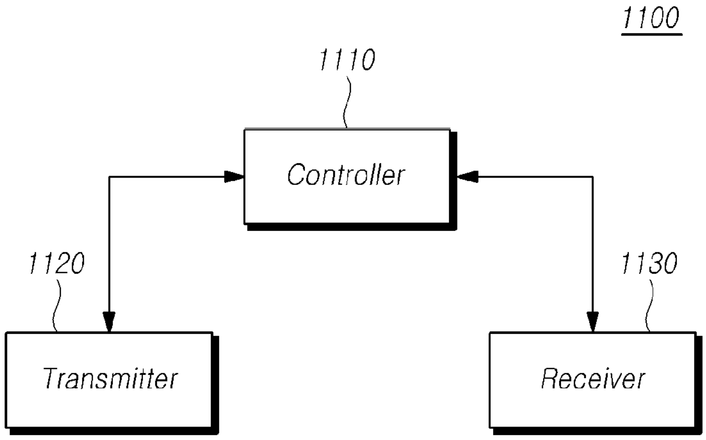
FIG. 11 is a block diagram illustrating a UE according to an embodiment.

FIG. 11 is a block diagram illustrating a UE according to an embodiment.

Referring to FIG. 11, a UE 1100 receiving multicast/broadcast service (MBS) data may include a receiver 1130 receiving an RRC message from a base station and a controller 1110 configuring a data inactivity timer based on the RRC message and, if receiving an MBS traffic channel (MTCH) MAC SDU for an MBS from an MAC entity, starting or restarting the data inactivity timer.

In accordance with an embodiment, the receiver 1130 may receive a higher layer message from the base station. For example, the higher layer message may be an RRC message. The RRC message may be an RRC connection reconfiguration message or an RRC connection configuration message.

The RRC message may include at least one of MBS radio bearer configuration information mapped to the MBS session and a data inactivity timer. For example, the MBS radio bearer configuration information may include information necessary to configure, in the UE, a radio bearer mapped to the MBS session to receive multicast data or broadcast data. The data inactivity timer may be included in the MBS radio bearer configuration information. Alternatively, the data inactivity timer may be included in a separate field distinguished from MBS radio bearer configuration information.

Further, the controller 1110 may configure a data inactivity timer in the UE based on data inactivity timer information included in the RRC message. Further, the controller 1110 may configure an MBS radio bearer mapped to the MBS session in the UE based on the RRC message. One or more MBS radio bearers may be configured. For example, the data inactivity timer is configured in the UE's MAC entity.

Further, the controller 1110 may control data reception in the MBS session based on the operation of the data inactivity timer. As an example, if the logical channel associated with the MBS session is received when the data inactivity timer is configured, the controller 1110 may start or restart the UE's data inactivity timer. In other words, when the MAC entity of the UE receives the MAC SDU of the MBCH, the controller 1110 may start or restart the data inactivity timer configured in the UE. As another example, if receiving multicast data for the active multicast session when the data inactivity timer is configured for the UE in the RRC connected state, the controller 1110 may start or restart the UE's data inactivity timer.

If the data inactivity timer expires, the MAC entity of the UE indicates expiration of the data inactivity timer to the higher layer (RRC layer).

Meanwhile, the base station may configure radio resources associated with the MBS session based on at least one of MBS session state information received from the core network entity, a message for activating the MBS session, and a message for deactivating the MBS session. For example, the base station may receive the MBS session state information from the core network entity (e.g., AMF or SMF or MB-SMF). As another example, the base station may receive the message for activating or deactivating the MBS session from the core network entity. Further, the base station may receive indication information for enabling MBS session state change (function), a timer (value) for checking MBS session state change, and the like from the core network entity. The above-described information may be received through an N2 message.

As described above, the receiver 1130 may receive an RRC message from the base station. For example, when the MBS session state information received by the base station from the core network entity indicates that it is active, the RRC message may include the MBS radio bearer configuration information for the MBS session and be transmitted to the UE. In other words, if the base station receives MBS session state information from the core network entity and the MBS session state information includes a value indicating that it is active, the base station may transmit an RRC message including MBS radio bearer configuration information for the MBS session to the UE.

Alternatively, when receiving a message for activating the MBS session from the core network entity or receiving MBS data, the base station may transmit a paging message including an MBS session ID for an RRC idle UE or an RRC inactive UE. For example, the base station may receive a message for activating the MBS session from the core network entity. Alternatively, the base station may receive MBS data from the core network entity. In this case, the base station may transmit the paging message including the MBS session ID for RRC idle UE or RRC inactive UE. The UE may receive the paging message, change the RRC state, and proceed with MBS data reception.

Alternatively, when the MBS session state information indicates that it is inactive or when a message for deactivating the MBS session is received, the base station may release the radio resource configuration for the inactive MBS session not to allocate radio resources for the inactive MBS session. For example, when the MBS session state information indicates that it is inactive or the base station receives a message for deactivating the MBS session, the base station may release the radio resource configuration for the corresponding inactive MBS session. Thus, the base station may not allocate radio resources for the MBS session indicated as inactive or inactive.

Besides, the controller 1110 controls the overall operation of the UE 1100 according to an operation for receiving MBS data necessary to perform the above-described embodiments.

The transmitter 1120 and the receiver 1130 are used to transmit or receive signals or messages or data necessary for performing the above-described embodiments, with the base station.

Figure 12:
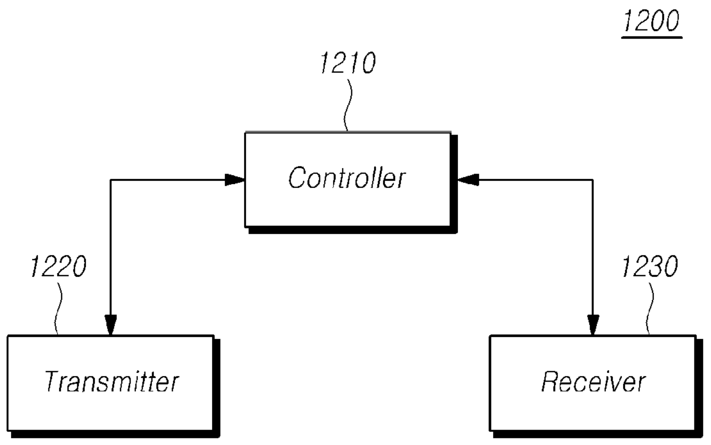
FIG. 12 is a block diagram illustrating a base station according to an embodiment.

FIG. 12 is a block diagram illustrating a base station according to an embodiment.

Referring to FIG. 12, a base station 1200 controlling multicast/broadcast service (MBS) data may include a receiver 1230 receiving at least one of MBS session state information, a message for activating an MBS session, and a message for deactivating the MBS session from a core network entity and a controller 1210 controlling a radio resource configuration associated with the MBS session based on at least one of the MBS session state information, the message for activating the MBS session, and the message for deactivating the MBS session.

According to an embodiment, the receiver 1230 may receive the MBS session state information from the core network entity (e.g., AMF or SMF or MB-SMF). According to another embodiment, the receiver 1230 may receive the message for activating or deactivating the MBS session from the core network entity. Further, the receiver 1230 may receive indication information for enabling MBS session state change (function), a timer (value) for checking MBS session state change, and the like from the core network entity. The above-described information may be received through an N2 message.

The controller 1210 controls the radio resource configuration associated with the MBS session based on messages and information received from the core network entity. Further, the transmitter 1220 may transmit an RRC message or a paging message to the UE based on the message and information received from the core network entity. To that end, the controller 1210 may perform operations, such as configuring an MBS radio bearer and configuring radio resources.

When the base station receives a message for activating the MBS session from the core network entity or receives MBS data, the transmitter 1220 may transmit a paging message including an MBS session ID for an RRC idle UE or an RRC inactive UE. For example, the receiver 1230 may receive a message for activating the MBS session from the core network entity. Alternatively, the receiver 1230 may receive MBS data from the core network entity. In this case, the transmitter 1220 may transmit the paging message including the MBS session ID for RRC idle UE or RRC inactive UE. The UE may receive the paging message, change the RRC state, and proceed with MBS data reception.

Alternatively, when the MBS session state information indicates that it is inactive or when the base station receives a message for deactivating the MBS session, the controller 1210 may control to release the radio resource configuration for the inactive MBS session not to allocate radio resources for the inactive MBS session. For example, when the MBS session state information indicates inactive or a message for deactivating the MBS session is received, the controller 1210 may release the radio resource configuration for the corresponding inactive MBS session. Thus, the controller 1210 may not allocate radio resources for the MBS session indicated as inactive or inactive. As described above, the core network entity may be an AMF or an SMF or an MB-SMF.

The UE, receiving the RRC message or paging message from the base station, may control the MBS data reception operation.

Besides, the controller 1210 controls the overall operation of the base station 1200 according to the MBS data transmission operation necessary to perform the above-described embodiments.

The transmitter 1220 and the receiver 1230 are used to transmit or receive signals or messages or data necessary for performing the above-described embodiments, with the UE.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

The invention claimed is:

1. A method for receiving multicast/broadcast service (MBS) data by a user equipment (UE), the method comprising:

receiving a radio resource control (RRC) message from a base station;

configuring a data inactivity timer based on the RRC message; and when a medium access control (MAC) entity receives an MBS traffic channel (MTCH) MAC service data unit (SDU) for an MBS, starting or restarting the data inactivity timer, wherein the base station configures a radio resource associated with the MBS session based on at least one of MBS session state information received from a core network entity, a message for activating an MBS session, and a message for deactivating the MBS session, and wherein when the MBS session state information indicates that it is active, the RRC message is received including MBS radio bearer configuration information about the MBS session.

2. The method of claim 1, wherein the RRC message includes at least one of MBS radio bearer configuration information mapped to an MBS session and the data inactivity timer.

3. The method of claim 1, wherein when the base station receives the message for activating the MBS session or the base station receives the MBS data, the base station transmits a paging message including an MBS session ID for an RRC idle UE or an RRC inactive UE.

4. The method of claim 1, wherein when the MBS session state information indicates that it is inactive or the base station receives a message for deactivating the MBS session, the base station releases a radio resource configuration for an inactive MBS session not to allocate a radio resource for the inactive MBS session.

5. A method for controlling multicast/broadcast service (MBS) data by a base station, the method comprising:

receiving at least one of MBS session state information, a message for activating an MBS session, and a message for deactivating the MBS session from a core network entity; and controlling a radio resource configuration associated with the MBS session based on at least one of the MBS session state information, the message for activating the MBS session, and the message for deactivating the MBS session; and when the MBS session state information indicates active, transmitting, to a UE, an RRC message including MBS radio bearer configuration information for the MBS session.

6. The method of claim 5, further comprising, when receiving the message for activating the MBS session or receiving the MBS data from the core network entity, transmitting a paging message including an MBS session ID for an RRC idle UE or an RRC inactive UE.

7. The method of claim 5, wherein controlling the radio resource configuration, when the MBS session state information indicates that it is inactive or the base station receives a message for deactivating the MBS session, controls to release a radio resource configuration for an inactive MBS session not to allocate a radio resource for the inactive MBS session.

8. A user equipment (UE) for receiving multicast/broadcast service (MBS) data, the UE comprising:

a receiver configured to receive a radio resource control (RRC) message from a base station; and a controller configured to setup a data inactivity timer based on the RRC message and, when an MAC entity receives an MBS traffic channel (MTCH) MAC service data unit (SDU) for an MBS, starting or restarting the data inactivity timer, wherein the base station configures a radio resource associated with the MBS session based on at least one of MBS session state information received from a core network entity, a message for activating an MBS session, and a message for deactivating the MBS session, and wherein when the MBS session state information indicates active, the RRC message is received including MBS radio bearer configuration information about the MBS session.

9. The UE of claim 8, wherein the RRC message includes at least one of MBS radio bearer configuration information mapped to an MBS session and the data inactivity timer.

10. The UE of claim 9, wherein when the base station receives the message for activating the MBS session or the base station receives the MBS data, the base station transmits a paging message including an MBS session ID for an RRC idle UE or an RRC inactive UE.

11. The UE of claim 8, wherein when the MBS session state information indicates inactive or the base station receives a message for deactivating the MBS session, the base station releases a radio resource configuration for an inactive MBS session not to allocate a radio resource for the inactive MBS session.

* * * * *